United States Patent

Macklin et al.

(10) Patent No.: US 6,569,233 B2
(45) Date of Patent: May 27, 2003

(54) PUMPABLY VERIFIABLE FLUID FIBER COMPOSITIONS

(75) Inventors: Michael B. Macklin, Westford, MA (US); Anandakumar Ranganathan, Waltham, MA (US); Klaus-Alexander Rieder, Beverly, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/962,830

(22) Filed: Sep. 25, 2001

(65) Prior Publication Data

US 2003/0056694 A1 Mar. 27, 2003

(51) Int. Cl.⁷ .............................................. C04B 16/06
(52) U.S. Cl. ...................... 106/644; 106/724; 106/802
(58) Field of Search .................................. 106/644, 802, 106/724

(56) References Cited

U.S. PATENT DOCUMENTS

| | | | |
|---|---|---|---|
| 3,716,386 A | 2/1973 | Kempster et al. | 106/90 |
| 4,224,377 A | 9/1980 | Moens | 428/369 |
| 4,367,191 A | 1/1983 | Cuculo et al. | 264/187 |
| 5,320,851 A | 6/1994 | de Mars et al. | 424/451 |
| 5,330,827 A * | 7/1994 | Hansen | 428/283 |
| 5,399,195 A * | 3/1995 | Hansen et al. | 106/711 |
| 5,413,460 A * | 5/1995 | Wilson et al. | 415/206 |
| 5,605,442 A * | 2/1997 | Wilson et al. | 415/206 |
| 5,618,341 A | 4/1997 | Andersen et al. | 106/287.35 |
| 5,679,145 A | 10/1997 | Andersen et al. | 106/162.5 |
| 5,683,772 A | 11/1997 | Andersen et al. | 428/36.4 |
| 5,747,125 A | 5/1998 | Markulin | 428/34.8 |
| 5,753,368 A | 5/1998 | Berke et al. | 428/375 |
| 5,817,493 A | 10/1998 | Reetz et al. | 435/182 |
| 5,895,688 A | 4/1999 | Bertoncini et al. | 427/421 |
| 5,993,537 A * | 11/1999 | Trottier et al. | 106/724 |
| 6,016,872 A | 1/2000 | Davis | 166/312 |
| 6,117,226 A | 9/2000 | Dial et al. | 106/162.8 |
| 6,164,380 A | 12/2000 | Davis | 166/312 |
| 6,221,152 B1 | 4/2001 | Dial et al. | 106/805 |
| 6,283,327 B1 * | 9/2001 | Rubtsov | 222/56 |
| 6,423,134 B1 * | 7/2002 | Trottier et al. | 106/802 |

FOREIGN PATENT DOCUMENTS

| | | | |
|---|---|---|---|
| CH | 690784 | * | 10/2000 |
| EP | 736501 A1 | | 10/1996 |
| EP | 0886628 B1 | | 11/1999 |
| WO | 9734849 A1 | | 9/1997 |
| WO | 97/34849 | | 9/1997 |

* cited by examiner

*Primary Examiner*—Paul Marcantoni
(74) *Attorney, Agent, or Firm*—William L. Baker; Craig K. Leon

(57) ABSTRACT

The invention relates to fiber compositions that can be pumped and metered in the fashion of fluid chemical admixtures into a concrete mix, thereby enabling the fibers to be dispensed by concrete ready-mix plant operators who can provide verification of fiber administration and dosage. The fibers, particularly plastic shrinkage control fibers having large cumulative surface area, are suspended in an aqueous or non-aqueous medium such that their surface area is already wetted out, thereby virtually assuring that substantial uniform fiber dispersion can be achieved without clumping and the delay that is usually required by fiber intermixing.

21 Claims, 1 Drawing Sheet

PUMPABLY VERIFIABLE FLUID FIBER COMPOSITIONS

FIELD OF THE INVENTION

The invention relates to fibers for plastic shrinkage crack control in cementitious compositions, and more particularly to a fiber composition that can be pumped and metered in a fashion similar to dispensing of fluid-type chemical admixtures, thereby facilitating verification of accurate dosage and achieving rapid and substantially uniform fiber dispersion within the mix.

BACKGROUND OF THE INVENTION

It is known in the construction industry to add fibers into fresh cementitious mixtures to improve characteristics of the resulting hardened structure. Natural fibers (e.g. Sisal, cotton) and fibers made of steel, glass, carbon or synthetic materials are typically added into concrete to improve fracture toughness and to retard crack propagation. Concrete is prone to self-induced cracking, and, as it is a brittle material, these cracks propagate readily under relatively low stresses.

Self-induced, non-structural cracks occur in large masses of ready-mixed concrete or shotcrete due to small cracks that form early (e.g., cracks resulting from shrinkage of concrete or shotcrete during its plastic state), and these are subsequently propagated by stresses induced by changes in the dimension of such relatively large structures. Pavement concrete units, for example, are typically about 3 meters by 10 meters by 200 millimeters. Small cracks in such concrete can readily propagate, producing a weak link that results in subsequent fracture. This clearly visible cracking is often the only form of cracking that is perceived as being of importance, but it is a direct result of much smaller and probably essentially invisible earlier crack development.

In U.S. Pat. No. 5,399,195, Hansen et al. taught the use of very fine synthetic polymer fibers (e.g., polypropylene, polyethylene, polyester) for preventing self-induced cracks from developing due to plastic shrinkage of concrete at the micro-level. To promote substantially homogeneous dispersal of the fine fibers in the concrete using conventional mixing techniques and equipment, this patent disclosed that fiber bundles containing up to about 10,000 fibers (e.g., filaments, tapes) could be treated with conventional wetting agents to render them hydrophilic, thereby facilitating their introduction into concrete.

Other means are known for admixing fibers into concrete. For example, U.S. Pat. No. 4,961,790 of Smith et al. disclosed a soluble bag for introducing fibers into a concrete mix. In U.S. Pat. No. 5,224,774, Valle et al. disclosed non-water-soluble packaging that disintegrated due to the grinding action of concrete thereby achieving substantially uniform fiber dispersal. These enabled ready-mix truck operators to avoid having to handle loose fibers and facilitated their dispersal within the mix.

Nevertheless, there remains a need for verifying that plastic shrinkage control fibers are incorporated into the concrete mix at the correct dosage; and, secondly, to ensure that they are properly intermixed to avoid balling and to achieve substantially uniform dispersal throughout the concrete mix. Synthetic polymer fibers, particularly the fine fibers or fibrillated tapes used for plastic shrinkage control, are difficult to see in the wet mix. Not only might such fibers have transverse dimensions as small as 15–35 $\mu$m, (micrometer) but they tend to be incorporated at low dosage rates due to their cumulatively large surface area. If clumping occurs beneath the concrete surface, these remain undetected; if clumps are found at the surface, these may be detected and removed for aesthetic reasons. In either case, the proper fiber dosage is not achieved; the risk of plastic shrinkage cracking increases.

Another major difficulty in verification is that fibers are added by the ready-mix truck operator who delivers the concrete to the construction site. The fibers are usually incorporated in dry batch amounts of 0.2–2.0 pound bags into the ready-mix trucks, wherein the bags disintegrate or dissolve to release the fibers into the concrete. Those ready-mix truck operators who are unscrupulous may use fewer than the prescribed amount of bags to pocket the difference and avoid the messiness, labor, and 10–15 minute delay necessitated per trip by this manual process. On the other hand, those ready-mix truck operators who are merely sloppy or negligent may fail to provide adequate mixing, may use the wrong fiber dosage or type, or may forget the fibers altogether. In each case, the risk of plastic shrinkage cracking increases (as does the ready-mix producer's liability for faulty concrete).

Ideally, the present inventors believe that automated addition of fibers at a ready-mix plant would help to resolve the multi-faceted problem of verification and to minimize or eliminate expensive concrete ready-mix truck standing time. This is because fiber addition can be performed under certifiable conditions by the batch plant operator, who has customarily been responsible for ensuring that desired chemical admixtures (e.g., water reducers, set accelerators or retarders, pigments, etc.) are added into the concrete mix at prescribed dosage levels. In other words, the fiber addition could be automated and recorded by computer panel instead of being performed manually as is the present case. This would avoid having to rely on truck operators who might lack the requisite experience, training, honesty, concern, diligence, or patience (or all of the above) to perform the task properly.

At present, a number of bulk fiber systems for automated dispensing of dry fibers are available. For example, Intech Corporation of Frederick, Colo., manufactures a system employing a vacuum to convey dry fibers into aggregate weigh hoppers, conveyor belts, or into concrete trucks. The system also purportedly has a capability for handling up to 300 pound bulk bags by automatic reloading. However, the present inventors believe that such bulk loading equipment may be too costly, complicated, and inconvenient for ready-mix plant operators to use or to integrate with existing chemical admixture dispensing equipment. This dry bulk fiber system does not provide verification that extremely fine, high-surface-area fibers of the kind used for plastic shrinkage control are sufficiently wetted out so as to achieve substantially uniformly dispersion in the concrete.

Accordingly, the present inventors believe that novel fibers and methods of fiber addition are needed.

SUMMARY OF THE INVENTION

In surmounting the disadvantages of the prior art, the present invention provides aqueous as well as non-aqueous fiber compositions useful for dispensing fibers into matrix materials such as concrete or shotcrete, using pumping and metering equipment that permits automated control and verifiability of accurate dosage amounts. Although fibers made from synthetic polymers (e.g., polyolefin) are typically hydrophobic, suspending them in a fluid environment is preferred to expedite their introduction into a wet concrete mix, to minimize clumping and facilitate intermixing, and to ensure substantially uniform distribution within the cementitious mix.

Thus, an exemplary fiber composition of the invention comprises a plurality of fibers, preferably made of synthetic polymers, glass, carbon or regeneratable sources, are suspended in an aqueous environment (which is essentially devoid of watersettable inorganic binder material), the fibers being present in the range of 5–40% based on weight of the composition, the aqueous environment comprising at least one viscosity modifier for increasing the viscosity of the water within the aqueous environment, which preferably has a Brookfield viscosity of 5,000–200,000 milliPascal·seconds measured at 25 degrees Celsius at 1 rpm.

Exemplary fiber compositions may also involve non-aqueous environments as well. For example, the fibers may be suspended in a liquid comprising an alcohol, alkylene ester or ether, or polyoxyalkylene glycol or ether, an amino alcohol, or a mixture thereof. Preferably, the non-aqueous environment comprises at least one viscosity modifier such as, for example, a suitable soluble polymer, or a non-water-settable inorganic material (e.g., metal oxides, silica, fly ash, glass flakes, nanoclay (i.e., clay particle having size in the order of one millionth of a millimeter), talc, or a platy mineral such as mica, etc.) comprising 0.5–50% by weight of composition. Other non-aqueous liquid suspension environments are also described herein.

Accordingly, exemplary fiber composition of the invention has a fiber-carrying liquid environment, whether aqueous or non-aqueous, wherein viscosity is 5,000–200,000 milliPascal·seconds (measured using Brookfield viscometer, 1 rpm, 25 degrees C.). Exemplary liquid environments also have a shear thinning characteristic, expressed in terms of viscosity ratio (Brookfield viscometer, 25 degrees C.), wherein measured at 3 rpm, divided by viscosity measured at 30 rpm, is no less than 2 and no greater than 40, more preferably no less than 4 and no greater than 20, and most preferably no less than 6 and no greater than 10.

Exemplary methods of the invention comprise dispensing the above-described liquid-fiber composition into a cementitious mix, and preferably this is accomplished by pumping and metering the prescribed dosage of fibers into the mix. Accurate dosages of the fibers may thus be performed and verified by the concrete manufacturer.

Thus, the present invention provides the ability to pump and meter the aqueous or non-aqueous liquid-suspended fibers at high speed into cementitious mixtures, concrete mixing trucks, or into a transport or storage container, and to provide the ability to automate and to monitor this liquid-fiber composition dispensing process. An exemplary method of the invention thus comprises flowing a liquid-suspension of fibers through a dispensing valve, which is preferably a pinch-valve, into a cementitious mixture, concrete mixing truck, or a transport or storage container, and monitoring the volume or mass of fibers thus dispensed.

Morever, the fiber compositions of the invention are also believed to improve pumpability and cohesiveness of reinforced cementitious materials such as shotcrete and spray-applied fireproofing. In addition to use in ready-mix concretes, the fiber compositions are particularly useful in self-compacting concretes and mortars in which compaction and workability are issues.

Particularly preferred fiber compositions of the invention comprise fiber bundles suspended in a liquid carrier environment, which retain a significant fraction of bundle structures during at least two successive pumping or dispensing events (e.g., pumping into storage containers, then subsequent pumping into hydratable cementitious composition), which bundle structures then are operative to disperse into individual fibers during mixing of the hydratable cementitious composition.

Further advantages and features of the invention are further described in detail hereinafter.

DESCRIPTION OF PREFERRED EMBODIMENTS OF THE INVENTION

Figure 1:
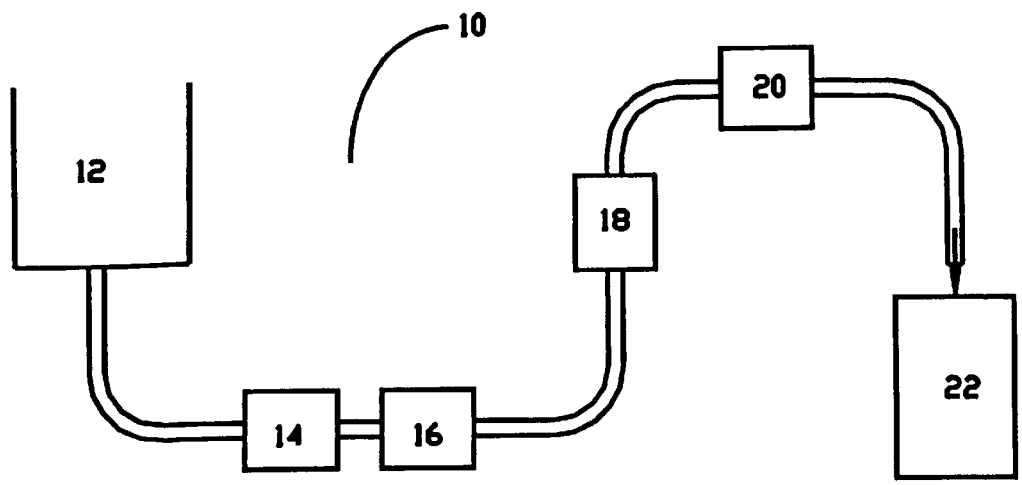
FIG. 1 is a plan diagram of an exemplary liquid-fiber dispenser system and process of the present invention.

The present invention relates to fiber compositions comprising a plurality of fibers suspended in aqueous liquid environments (e.g., water used as carrier for fibers) as well as non-aqueous liquid environments (e.g., non-water based carrier for fibers).

Exemplary liquid environments (both aqueous and non-aqueous) of the present invention for carrying/suspending the fibers preferably have the following viscosity characteristics. First, the liquid carrier or environment should preferably have a viscosity of 5,000–200,000 milliPascal·seconds (measured using Brookfield viscometer, 1 rpm, 25 degrees C.), Second, exemplary liquid environments preferably have a shear thinning characteristic which can be expressed in terms of the ratio of viscosity measured at two different spindle speeds (revolutions per minute, or "rpm") using Brookfield viscometer, 25 degrees C.). Thus, viscosity measured at 3 rpm, when divided by viscosity measured at 30 rpm, is no less than 2 and no greater than 40, more preferably no less than 4 and no greater than 20, and most preferably no less than 6 and no greater than 10. Further fiber-carrier liquid may comprise water in combination with drying shrinkage admixtures (a term used herein to refer to additives which minimize drying shrinkage in cementitious materials such as concrete or shotcrete), or non-aqueous environments which contain the drying shrinkage admixture by itself (i.e., substantially without water as carrier, but at most with only dispersed water droplets or water in discontinuous phase within the non-aqueous carrier).

For example, an exemplary non-aqueous environment comprises a polyoxyalkylene glycol. U.S. Pat. No. 5,938,835 of Shawl et al. disclosed a mixture of certain alkyl ether oxyalkylene adducts with oxyalkylene glycols for inhibiting drying shrinkage in cements, while permitting substantial air entrainment and enhanced compressive strength. A liquid composition comprising such an oxyalkylene mixture was found by the present inventors to provide a suitable non-aqueous liquid carrier for dispensing fibers into a concrete mixture using pumping means. The viscosity of such a liquid composition may be modified, such as by addition of polyethers or polyacrylates, to achieve preferred viscosity characteristics in the fiber-suspending environment, as described herein. Accordingly, an exemplary non-aqueous fiber carrier may comprise a polyoxyalkylene glycol represented by the formula $HO(AO)_mH$ wherein A represents an alkylene group (preferably $C_2$–$C_4$), O represents an oxygen atom, and m represents an integer preferably in the range of 1–3.

A further exemplary non-aqueous fiber carrier may comprise (a) at least one 15 alkyl ether oxyalkylene adduct represented by the formula $RO(AO)_nH$ wherein A represents a $C_2$–$C_4$ alkylene group, O represents an oxygen atom, R represents a tertiary alkyl group, and n represents an integer from 1 to 3; (b) an polyoxyalkylene glycol represented by the formula $HO(AO)_mH$ wherein A represents an alkylene group (preferably $C_2$–$C_4$), O represents an oxygen atom, and m represents an integer preferably in the range of 1–3; or a mixture of (a) and (b). Moreover, in further exemplary embodiments, component (a) may comprise dipropylene glycol t-butyl ether, tripropylene glycol t-butyl ether, or mixtures thereof; while component (b) may comprise dipropylene glycol, tripropylene glycol, or mixtures thereof. (See e.g., U.S. Pat. No. 5,938,835).

Other exemplary drying shrinkage admixtures which can be employed as non-aqueous fiber carriers suitable for providing a liquid fiber suspension, are listed below. Some of these may be converted into an aqueous fiber-suspending environment if desired:

For example, U.S. Pat. Nos. 2,307,741 and 5,174,820 disclosed a composition having the formula $R^1$—O—$A_n$—$R_2$ wherein A represented oxyalkylene groups having the formula $(C_2H_4O)_n$, $(C_3H_6O)_n$, and $(C_4H_8O)_n$, and mixtures thereof; n is a number from 2–50; $R^1$ and $R^2$ represented hydrogen or an alcohol giving an ether $CH_3$—$(CH_2)_m$—$CH_2$—O— or a carboxyl group giving an ester $CH_3$—$(CH_2)_m$ CO—, m represents a number of 0 to 20.

U.S. Pat. No. 5,556,460 of Berke et al., disclosed a composition having the formula $Q[(O—An—R1)]_x$ wherein A, R, and n are the same as for U.S. Pat. No. 2,307,741 discussed above, and Q represents a $C_3$–$C_{12}$ linear, branched or cyclic polyhydroxy hydrocarbon. The Berke patent further described a composition comprising (a) at least one oxyalkylene glycol, oxyalkylene ether glycol, or mixtures thereof having a molecular weight of up to about 4000; and (b) a comb polymer of a molecular weight of from 2,000 to 100,000 having (i) carboxylic acid anhydride, free carboxylic acid or its ammonium, alkali or alkaline earth metal salt and (ii) $C_2$–$C_5$ oxyalkylene units or mixtures of these units, wherein units (i) or (ii) were pendant from the polymer backbone and said units (ii) provided the majority of the molecular weight of the polymer, the components (a) and (b) further being in a weight ratio of 1:1 to 100:1. Such exemplary compositions are believed to be suitable for use in the present invention.

Other known drying shrinkage admixtures may be suitable for making non-aqueous or aqueous fiber suspensions, and the inventors provide a list of some known drying shrinkage compositions which are believed to be suitable for the purposes of the present invention:

U.S. Pat. No. 4,209,336 of Previte disclosed compressive strength-enhancing surface active agents which are believed suitable for providing a non-aqueous environment for carrying fibers in accordance with the invention. Such compressive strength-enhancing surface active agents were selected from the group consisting of non-ionic block copolymers of alkylene diamines and one or more alkylene oxides; non-ionic acetylenic glycols and reaction products thereof with alkylene oxides; non-ionic polyethylene glycol esters; non-ionic polyoxyethylene ethers of oleyl alcohol; anionic phosphate esters of an ethoxylated alkylphenol, potassium salt; non-ionic block copolymers prepared by the sequential addition of ethylene oxide and then propylene oxide to an ethylene glycol base; non-ionic block copolymers prepared by sequential addition of propylene oxide and then ethylene oxide to a propylene glycol nucleus wherein (a) the molecular weight of the resulting poly(oxypropylene) portion of the copolymer ranges from about 1,750 to about 2,750 and the resulting percent poly(oxyethylene) portion in the total copolymer molecule being from about 10 to about 30; (b) said molecular weight is from about 2,750 to about 4,000; and said percent poly(oxyethylene) is from about 10 to about 20; (c) said molecular weight is 950 and said percent poly(oxyethylene) is 10; (d) said molecular weight is 1,200 and said percent poly(oxyethylene) is 20; and mixtures of the foregoing.

U.S. Pat. No. 4,547,223 of Goto et al. disclosed a drying shrinkage admixture comprising compound of general formula $RO(AO)_nH$ wherein R represents a $C_1$–$C_7$ alkyl or $C_5$–$C_6$ cycloalkyl radical, A represents one or more $C_2$–$C_3$ alkylene radicals, and n has a value of 1–10.

U.S. Pat. No. 5,174,820 of Sakuta et al. disclosed a terminal alkyletherified compounds or terminal alkylesterified compounds of polymers having —$C_2H_5O$— or —$C_3H_6O$— as repeating units.

U.S. Pat. No. 5,181,961 of Umaki et al. (Nihon Cement) disclosed a low shrinkage composition represented by the formula R—OH wherein R represented a $C_4$–$C_6$ linear, branched, or cycloalkyl hydrocarbon.

U.S. Pat. No. 5,326,396 of Abdelrazig et al. disclosed a composition having the formula $R_1$—$NH_2$ or $R_1$—X—NHCO—$R_2$ wherein $R_1$ represents a $C_4$–$C_6$ alkyl group, X represents an oxygen atom or secondary nitrogen group (NH), and $R_2$ represents hydrogen atom or $C_1$–$C_3$ alkyl group when X is a secondary amine and $R_2$ represents a primary amino group or —$CH_2$ $C(O)CH_3$ when X represents oxygen atom.

U.S. Pat. No. 5,326,397 of Abdelrazig et al. disclosed at least one compound of the formula $R(—O—CO—NH_2)_n$ where R=$C_3$–$C_8$ alkyl or $C_5$–$C_8$ cycloalkyl hydrocarbon when n=1 or a $C_2$–$C_{10}$ alkylene group or a group having the formula $A(OA)_xOA$ wherein each A is a $C_2$–$C_3$ alkylene and x is an integer of from 0 to 10 when n=2.

U.S. Pat. No. 5,389,143 of Abdelrazig et al. disclosed a compound of the formula $R^1R^2N$—$CR^3R^4$—$CH_2OH$ wherein $R^1$ and $R^2$ are each individually selected from hydrogen or an alkyl group having 1 to 3 carbon atoms; $R^3$ and $R^4$ are hydrogen or alkyl group containing 1 to 8 carbon atoms, provided that $R^3$ and $R^4$ groups together represent at least two carbon atom-containing groups).

U.S. Pat. No. 5,413,634 of Shawl et al. disclosed drying shrinkage admixtures comprising oxyalkylene ether adduct, optionally with alkylene diols.

U.S. Pat. No. 5,571,319 of Dallaire et al. disclosed a drying shrinkage admixture comprising an aqueous mixture of an alkali or alkaline earth metal nitrite and fumed silica in combination with an alkylene glycol or polyoxyalkylene glycol.

U.S. Pat. No. 5,603,760 of Abelleira et al. disclosed a drying shrinkage admixture comprising an oxyalkylene compound selected from oxyalkylene glycols and oxyalkylene ether adducts of glycols or glycerols with organic ammonium salts of tall oil fatty acids.

U.S. Pat. No. 5,604,273 of Gilbert et al. disclosed a drying shrinkage admixture comprising a lower alkylene diol having secondary and/or tertiary hydroxy groups, with copolymer of alkenyl ether and/or maleic anhydride.

U.S. Pat. No. 5,618,344 of Berke et al. disclosed a drying shrinkage admixtures comprising at least one oxyalkylene ether adduct having formula $RO(AO)_nH$ wherein A is selected from $C_2$–$C_4$ alkylene groups, O represents oxygen, R is $C_1$–$C_7$ alkyl or $C_5$–$C_6$ cycloalkyl group, and n is an integer of 1 to 5; in combination with an alkylene glycol represented by the formula HOBOH wherein B is selected from $C_3$–$C_{10}$ group).

U.S. Pat. No. 5,622,558 of Berke et al. disclosed a drying shrinkage admixture comprising a lower alkylene glycol or polyoxyalkylene glycol in combination with fumed silica.

U.S. Pat. No. 5,626,663 of Berke et al. disclosed a mixture of at least one polyol of the formula R'—C(R)(OH)—(CH)$_{2n}$—C(R)(OH)—R' wherein each R independently represents hydrogen or $C_1$–$C_2$ alkyl; each R' independently represents a $C_1$–$C_2$ alkyl, and n is an integer of 1–2.

U.S. Pat. No. 5,679,150 of Kerkar et al. disclosed an oxyalkylene compound such as oxyalkylene ether adduct and a betaine.

U.S. Pat. No. 5,779,788 of Berke et al. disclosed drying shrinkage admixture comprising oxyalkylene ether adduct having formula RO(AO)$_n$H wherein A is selected from $C_2$–$C_4$ alkylene groups, n has a value of 1 to 5, and R represents a $C_1$–$C_7$ alkyl or $C_5$–$C_6$ cycloalkyl group; in combination with a sulfonated organocyclic material.

The foregoing patents are incorporated by reference as if set forth herein, and describe known shrinkage reduction admixtures, and the compositions which are believed suitable for providing a non-aqueous liquid fiber carrier (environment) for the present invention. In view of the foregoing compositions which are believed suitable for constituting or formulating non-aqueous liquid fiber-carrying suspensions (or environments) of the present invention, it will be seen for example that such suspensions may comprise an alcohol; or an alkylene or oxyalkylene glycol or glycerol, or an ether, ester, or other derivatives thereof. Preferred non-aqueous suspensions comprise a polyoxyalkylene glycol or glycerol or derivative thereof, and these are preferred if they also impart some degree of shrinkage reduction to the cementitious composition being treated.

The fiber compositions of the present invention are intended for modifying properties of any matrix composition, including, without limitation, adhesives, emulsions, composite materials (e.g., resins), plastics, elastomers such as rubber, etc., and cementitious materials. Of particular importance to the present inventors are hydratable cementitious materials such as ready-mix concrete, precast concrete, masonry, shotcrete, bituminous concrete, gypsum-based compositions (such as compositions for wallboard), gypsum- and/or Portland cement-based fireproofing compositions (for boards and spray-application), and other hydratable cementitious compositions.

In connection with hydratable cementitious compositions, the terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace slag, pozzolans, metakaolin, and silica fume or other materials commonly included in such cements) and water; mortars are pastes additionally including fine aggregate (e.g., sand); and "concretes" are mortars additionally including coarse aggregate (e.g., gravel, stones). The term "cementitious" thus refers to and includes the foregoing. For example, a cementitious composition may be formed by mixing required amounts of certain materials, e.g., hydratable cementitious binder, water, and fine and/or coarse aggregate, as may be desired, with fibers as described herein.

The fibers of the invention may comprise material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers. Plastic shrinkage performance may be achieved using a number of fiber shapes, such as monofilament (round), elliptical, flat (ribbon shaped), prefibrillated (e.g, slit tape, slit sheet), or other shape.

Preferred synthetic polymers are polypropylene and polyethylene, with polypropylene being most preferred for controlling plastic shrinkage cracking in concrete. Exemplary individual fiber bodies of the invention may comprise 100% polypropylene, or, as another example, may comprise predominantly polypropylene (e.g., at least 70–99%) with the remainder comprising another polymer (such as high density polyethylene, low density polyethylene) or optional fillers, processing aids, and/or wetting agents, such as are conventionally used in the manufacture of polymer fibers. Fibers believed suitable for the present invention and particularly for plastic shrinkage control, are disclosed in U.S. Pat. No. 5,399,195 of Hansen et al., which is incorporated herein by reference. Preferably, the plurality of fibers comprise individual fibers having two opposed ends connected by an elongate intermediate body, the average length of the fiber bodies being 5–50 millimeters, and more preferably 10–20 millimeters in length, and the mean transverse dimension of said fiber bodies being 5–100 $\mu$m, and more preferably 15–35 $\mu$m. Fibers within these dimensions are available from Grace Construction Products of Cambridge, Mass.

Another exemplary fiber material believed suitable for use in the present invention comprises a polypropylene coated with a polyhydroxyaminoether material. Such fibers are available from Dow Chemical, Midland, Mich.

Exemplary fibers of the invention are suspended in a wet fluid aqueous or non-aqueous environment with the resultant combination being characterized as having the consistency of a pumpable "grease" or "wet paste." While it is known to coat or lubricate fibers with conventional wetting agents, this concept is different than deploying an aqueous suspension of synthetic polymer fibers that is pumpable and capable of being metered. While it is also known that synthetic polymer fibers can be suspended in sprayable shotcrete slurries and sprayable fireproofing slurries (which contain hydratable cementitious binders), the present inventors believe that it is novel to employ, as a means for delivering and pumping synthetic polymer fibers into a cementitious mix, an aqueous or non-aqueous suspension of synthetic polymer fibers, a suspension that is essentially devoid of water-settable inorganic binder material if an aqueous or water-containing environment is used. The term "essentially" is used herein to refer to the total absence of any water-hardenable inorganic binder material, or else to its near-absence (i.e. amounts so miniscule or de minimus as not to cause an aqueous suspension of fibers to stiffen or harden due to hydration, whereby pumpability is thwarted).

Preferably, the plurality of fibers is added into the aqueous or non-aqueous environment (the suspension medium) incrementally and mixed by slow rotating mixing elements.

Particularly in aqueous or non-aqueous suspensions, the inventors prefer that the fibers be present in bundles, which arise conventionally through the fiber manufacturing process, wherein bunches of continuous strands are chopped to the desired lengths and may be fixed into bundles using conventional wetting agents (e.g., surfactants, emulsions, etc.). If the fibers are packaged with minimal mechanical disturbance, the bundles can remain intact. The fiber bundles are deliberately kept intact in the aqueous or non-aqueous suspension also to facilitate flowability of the fibers, such that the resulting thick suspension has the necessary flow characteristics to permit continuous pumping using mechanical pumping equipment. When fibers are in bundles, less fluid is attached to the fiber surface and thus more fluid is available for flow especially at high fiber concentrations. Also, each bundle is believed to act as a solid independent suspended particle within the fluid medium, and consequently this reduces fiber-fiber interaction which otherwise is detrimental to flow characteristics of the suspension. The retention of this preferred bundle structure is helped by the high viscosity of the surrounding fluid medium wherein capillary flow is reduced and fluid is prevented from penetrating the bundles and becoming absorbed.

Accordingly, bundles of fibers (e.g., filaments) are preferably coated with a wetting agent during manufacture or otherwise prior to being inserted into the aqueous (or non-aqueous) suspension medium. The choice of optional wetting agent is not believed to be critical to the present invention, although it would be preferred to choose wetting agents that do not negatively impact the concrete properties and do not introduce substantial amounts of air into the mix. Exemplary wetting agents are disclosed in U.S. Pat. No. 5,399,195 of Hansen et al., incorporated herein by reference. Preferred wetting agents are fatty acid esters of glycerides, fatty acid amides, polyglycol esters, polyethoxylated amides, nonionic surfactants, cationic surfactants and blends of the above (See e.g., U.S. Pat. No. 5,399,195). Alternatively, alkali soluble substances can be used to coat individual fibers so as to keep the fiber bundles intact during manufacturing and dispensing, while permitting the bundles to break up into individual fibers or filaments when intermixed in concrete and thereby become substantially uniformly dispersed within the concrete mix.

In exemplary embodiments of the invention, the fibers (preferably in bundles as just discussed) are suspended in an aqueous environment having a viscosity of 5,000–200,000 milliPascale·seconds as measured by Brookfield viscometer at 25 degrees C. More preferably, the viscosity is 7,500–50,000, and, most preferably, the viscosity is 10,000–20,000 milliPascal·seconds (Brookfield, 25 degrees C.).

While bundled fibers are believed to provide the highest solids content, it is possible to use loose fibers, fibrillated fibers, fibrillatable fibers, tapes, or other conventional shapes as may be customarily supplied into the construction industry.

Exemplary viscosity modifying agents useful for increasing the viscosity of the water in aqueous suspensions can comprise any water soluble polymer, preferably having a linear molecular structure; polyacrylic acid or salt thereof; polyacrylamide; polyvinylmethyl ether; a polysulfonic acid or salt thereof; a polyvinyl alcohol; a polythylene glycol; a polyethylene oxide; a polysaccharide or derivatives thereof; a non-water-settable inorganic particulate or platy material (for example, nanoclay); or mixture thereof. A preferred viscosity modifiers are polysaccharides such as hydroxy propyl methylcellulose, welan gum, or xanthan. Viscosity modifiers used in the invention should be chosen such that the final concrete properties are not adversely affected, and such that they are compatible with other admixtures that may be incorporated into the final cementitious mix.

For exemplary non-aqueous fiber suspensions, non-water-settable inorganic or finely divided insoluble organic materials may be used as exemplary viscosity modifiers in the amount of 0.5–50%, preferably 5–30%, and most preferably 10–20%, based on total weight of solids in the composition. Exemplary viscosity modifying agents for non-aqueous fiber carrying suspensions (environments) include metal oxides, silica, fly ash, glass flakes, nanoclay, mica, talc, etc. Inorganic materials can be suitably treated with surface compatibilizing agents such as silanes and other organometallic compounds known in the art which help stabilize such suspensions.

A preferred exemplary fiber composition of the invention comprises the following components in the following percentages based on total weight of the composition polypropylene fibers (5–40%); viscosity modifier (0.2–5%); and water (95–60%).

Fiber compositions of the invention may comprise one or more admixtures as may be known in the concrete art. Exemplary admixtures include superplastizicers, water reducers, strength enhancers, concrete-fiber bond enhancing agents, air entrainers, air detrainers, corrosion inhibitors, set accelerators, set retarders, shrinkage reducing admixtures, fly ash, silica fume, pigments, finish enhancing chemicals, internal curing compounds (e.g., methylcellulose), or a mixture thereof. Known admixtures may be employed, such as, for example, those categorized in U.S. Pat. No. 5,203,692 of Valle et al., or in U.S. Pat. No. 6,224,250 of Kreinheder et al, both incorporated by reference herein. The fibers may also be coated with wetting agents or other coating materials known to those of ordinary skill in the art, as previously mentioned above.

The invention therefore provides a novel method for modifying water-based matrix materials, particularly cementitious compositions. Accordingly, an exemplary method comprises dispensing, into a hydratable cementitious composition, a plurality of synthetic polymer fibers suspended in an aqueous or non-aqueous environment (which, if aqueous in nature, is essentially devoid of a water-settable inorganic binder material); said fibers being in an amount no less than 5 percent based on total weight of composition; said fibers being in an amount no greater than 40 percent based on total weight of composition; said aqueous or non-aqueous environment having a viscosity no less than 5,000 milliPascal·seconds (as measured by Brookfield viscometer at 25 degrees Celcius, 1 rpm); said aqueous or non-aqueous environment having a viscosity no more than 200,000 milliPascal·seconds (as measured by Brookfield viscometer at 25 degrees C., 1 rpm); and said aqueous or non-aqueous environment having at least one viscosity modifier for increasing the viscosity within said aqueous or non-aqueous environment.

The fiber compositions of the invention may be packaged in large "totes" (plastic or metal drums or bulk containers) for shipment to concrete ready-mix plants or other locations. The fiber compositions of the invention may also be conveyed in bladders (large bags) that are, in turn, contained in boxes.

In other exemplary embodiments, the aqueous or non-aqueous fiber suspensions may comprise one or more biocidal agents. The term "biocidal agents" as used herein refer to agents commonly used for inhibiting bacterial and fungal growth, including fungicidal, germicidal, and insecticidal agents. Preferred biocidal agents include 4-chloro-3 methyl phenol (and other polyhalogenated phenols); sodium-O-phenylphenate; benzylbromoacetate; 1,2-dibromo 2,4-dicyanobutane; dieldrin emulsions; copper compounds; or mixture thereof.

The fiber compositions of the invention may be dispensed into the matrix material (e.g., concrete or other cementitious composition) using conventional metering pump equipment of the kind used for pumping pastes, greases, industrial lubricants, and other viscous liquids as known in these industries. Accordingly, the aqueous or non-aqueous fiber suspensions may be dispensed into matrix compositions using pumping and metering equipment conventionally used for dispensing greases, lubrication, flowable pastes, etc. For example, automatic grease lubrication systems are used for pellet presses, gears, stone-crushers, cement kilns, screw conveyors, travelling hoists, process filters, ship steering, and lubrication of rudder shafts, cranes, rotary filters, industrial separators, etc. Such lubrication systems usually involve heavy-duty electric pumps or hydraulic pumps for conveying viscous grease lubricants from bulk barrels, through tubing or pipes, to any number of lubrication points. A preferred pump is a volumetric reciprocating piston pump wherein the number of strokes can be controlled to meter the required amount of the suspension being conveyed under pressure. Other preferred pumps include air diaphragm pumps, progressive cavity pumps, peristaltic pumps, and lobe pumps. Thus, the amount of addition can be pumped and metered using piston pumps, for example, and the amounts of addition can be monitored by automated means (e.g., counting the number of piston strokes).

In further exemplary embodiments, the fiber compositions comprise fiber bundles, which retain a bundle form due either to the nature of the polymeric material, and/or to the use of wetting agents or surfactants. With regard to the use of wetting agents to achieve bundles, see e.g., U.S. Pat. Nos. 5,330,827 and 5,399,195 of Hansen, incorporated by reference herein. The retention of significant fraction of bundles through at least two successive pumping events (e.g., when pumped into a storage tank and thereafter pumped into a hydratable cementitious composition) is preferred, and this may be achieved by minimizing shearing forces during pumping, transporting, and dispensing. Conceivably, it is possible that the fiber composition can be subjected to numerous successive pumping events, and care should be taken to preserve significant fraction of the bundle structure up until the point the fibers are introduced into the hydratable cementitious composition (e.g., concrete or shotcrete) being treated. Nevertheless, the fiber bundles should also be operative, after these pumping events, to disperse into individual fibers upon mixing of the hydratable cementitious composition being treated.

Further features and advantages of the exemplary fiber compositions and processes of the invention may be illustrated by reference to the following example.

EXAMPLE 1

A 1.5 weight % aqueous solution of hydroxypropyl methyl cellulose—referred to as HPMC hereafter—(METHOCEL™ K15M, supplied by Dow Chemical Co, USA) is prepared as follows: about 2.5 kg of water is heated to about 90 degrees C. 120 grams of HPMC is dispersed into the hot water while stirring. This mixture is further added to cold water (about 15 degrees C.) while stirring to make up to a total of 8 kg. The mixture is stirred to render it homogeneous and is allowed to reach ambient temperature. (Optionally a suitable germicidal agent can be added to this solution to prevent any biological growth during storage). The resulting solution has a Brookfield viscosity of about 10,000 milliPascal·sec at 25 degrees C. Eight kilograms of the solution thus prepared is measured into a mixing machine with slow rotating intermeshing mixing elements. 2 kg of a plastic shrinkage control fiber (having transverse dimension of less than 30 $\mu$m) (microfibers available from Grace Construction Products) is added to this solution in increments of 200 grams while mixing. It is important that mixing be performed so as to achieve a homogeneous suspension, and that proper care be taken to cause minimum disturbance to the bundled structure of the fiber. The fiber suspension can be stored in suitable containers such as pails, drums or bag-in-a-box.

EXAMPLE 2

A 1 weight % aqueous solution of a bacterial polymer—(welan gum supplied by CPKelco Co., USA) is prepared as follows: 80 grams of welan gum is dispersed into 200 ml of ethanol. This mixture is further added to cold 7720 grams of water while stirring to make up to a total of 8 kg. The mixture is stirred to render it homogeneous (optionally a suitable germicidal agent can be added to this solution to prevent any biological growth during storage). The resulting solution has a Brookfield viscosity of about 100,000 milliPascal·sec at 25 degrees C. and 1 rpm. Eight kilograms of the solution thus prepared is measured into a mixing machine with slow rotating intermeshing mixing elements. 2 kg of a plastic shrinkage control fiber (having transverse dimension of less than 30 $\mu$m) (microfibers available from Grace Construction Products) is added to this solution in increments of 200 grams while mixing. Care is taken to ensure individual bundles are wettted and no big lumps are formed.

EXAMPLE 3

Liquid-fiber compositions of the invention may be made using batch-type or continuous mixers that introduce little or no shear into the fibers. Preferably, the liquid-fibers compositions contain bundles of fibers that are uniformly suspended throughout the aqueous or non-aqueous medium.

For example, a conical screw mixer (such as commercially available from NAUTA) can be used to incorporate the fibers into the liquid carrier. A portion of the fibers is added through the top of the mixer until these are blended in, and then another portion of the fibers can be added, and this process may be repeated until the desired fiber concentration is attained. The liquid-fiber composition may be then dicharged out of the bottom of the mixer, preferably through an opening of around 7.5 cm. If needed, a pressure of up to 2 pounds per square inch may be used to push the material out of the mixer. Care should be taken to ascertain that there are no large patches of dry fiber, and care should also be taken to avoid over-mixing the fibers or to disrupt the fiber-bundle structures suspended in the liquid carrier.

It is also envisioned that continuous mixers may be used to incorporate the fibers and the liquid carrier together in a gentle manner as well.

The present invention also provides devices (i.e. equipment systems) and processes for dispensing the liquid-fiber compositions described above into ready mix trucks, storage tanks, mixers, or containers. An exemplary method of the invention comprises: flowing an aqueous or non-aqueous liquid suspension of fibers through a dispensing valve into a cementitious mixture, ready mix truck, or a transport or storage container; and monitoring the volume or mass of fibers or liquid suspension of fibers thus dispensed. Particularly preferred embodiments are discussed in the following paragraphs and illustrated in FIGS. 1–3.

As illustrated in FIG. 1, an exemplary liquid-fiber dispensing device 10 of the invention includes a storage vessel 12, a positive displacement mechanism 14 (for pumping the liquid-fiber composition), optionally a pulsation dampener 16, a metering device 18, and a valve 20 that is preferably situated just before the liquid-fiber mixture is dispensed into a container, tank, mixing tank, mixing drum of a ready-mix truck, or other storage or transportation vessel 22. The hoses, pipes, or conduits (all hereinafter referred to as "pipes") used for connecting the vessel, pumps, meters, and valves (12–20) should be wide enough in diameter (e.g., between 2–12 cm) to convey the liquid-fiber material and avoid clotting, and any restrictions or tapering or decreases in diameter, such as might occur at port transitions between the equipment and connective pipes, should be gradual rather than abrupt. The present inventors have found it preferable to employ a progressively narrower pipe diameter towards the dispensing end of the system. In other words, one might use a larger diameter pipe from the storage vessel 12 to the pump 14, and then a slightly narrower diameter pipe between the pump 14 and/or optional pulsation dampener 16 and metering device 18, so as to increase accuracy of the metering. Preferably, the diameter of the flow through conduits in the meter 18 are equal to or narrower than the diameter of the pipe immediately preceding and following the meter 18.

Exemplary storage vessels 12 of the invention have at least one opening or mouth for enabling the liquid-fibers to be loaded into the vessel 12, and at least one discharge port for emptying vessel 12. Preferably, the discharge port should have a diameter of at least 4 cm, and more preferably 7.5 cm or greater. The large storage vessel 12 should be constructed so as preferably to avoid "rat holing." "Rat holing" occurs when air gets sucked through the discharge port, and thus causing the poorly flowing residual amount of material (liquid-fiber) to remain at the bottom of the vessel. To avoid a "heel" formation of residual material that remains around the discharge port, preferred storage vessels 12 of the invention include hoppers or tanks having bottom surfaces which slope toward the discharge port, thus minimizing the tendency for "rat holes" and "heels" to form. A further exemplary storage vessel 12 can be a collapsible bag housed within a rigid box. The bag can be drawn empty while avoiding air that could be sucked into the system 10.

The function of the storage vessel 12 is to hold a large quantity of fibers in an aqueous or non-aqueous liquid suspension that can be conveyed and metered (or otherwise measured) into another vessel, such as a ready mix truck, into another transport container (e.g., train car container), a bulk container, or into a cementitious composition such as a concrete mix. The storage vessel 12 may also, in further embodiments, be a blender having one or more internal paddles, ribbons, or screws for mixing (so long as shear forces are avoided or minimized so that fiber bundles are not disrupted).

Exemplary pump devices 14 of the invention preferably include positive displacement devices having low shear so as to avoid damaging the integrity of fiber bundles suspended in the fluid compositions. For example, an air diaphragm pump (e.g., three inch) with smooth flow path and flapper check valves, piston pump, peristaltic pump, progressive cavity pump, and lobe pumps are contemplated for use within the invention.

Optional pulsation dampener 16 of the invention may be used for attenuating the effect of the pump devices, particularly where a pulse flow pump is used (i.e. air diaphragm pump, piston pump). A pulsation dampener contains a volume of air that is pressurized on the "up-stroke" of the pump as material fills the pulsation dampener 16. On the "down-stroke" of the pump, the air in the pulsation dampener pushes the material through the discharge line, thereby maintaining more even flow at the discharge. A preferred pulsation dampener 16 device may comprise the use of a "T" shaped connector in the piping wherein two of the three pipes serve merely as a conduit for connecting the pump 14 with the flow meter 18, while the third pipe is merely filled with air and capped at the end.

Exemplary flow meters 18 are pass-through type flow meters, and these could be volumetric flow meters (e.g., magnetic) or mass flow meters. The meters should preferably be selected so as to avoid introducing shearing forces into the liquid-fiber composition flowing through the system 10. Flow meter size should be selected based on the accuracy required. In the present invention, a minimum diameter for the flow meter 18 is preferably 2.5 cm.

Figure 2:
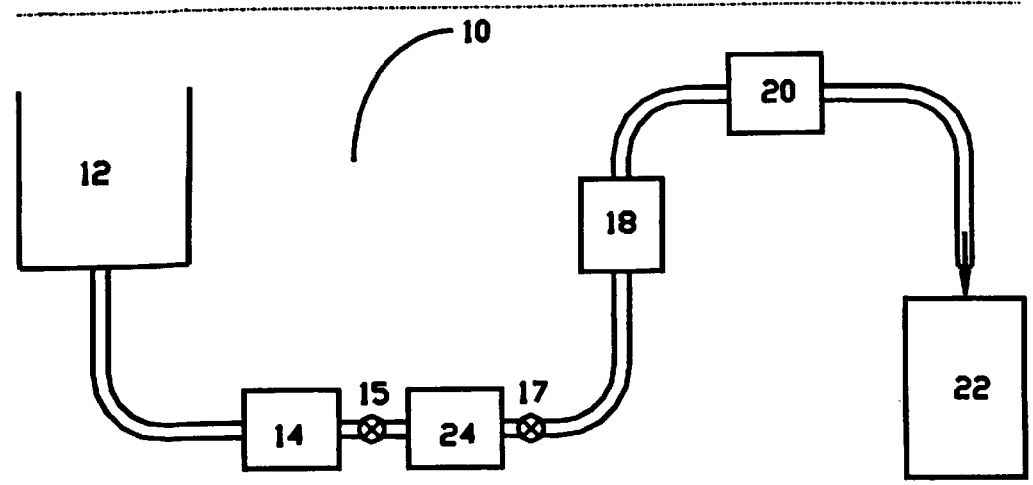
FIG. 2 is a plan diagram of another exemplary liquid fiber dispenser system and process of the present invention.
Figure 3:
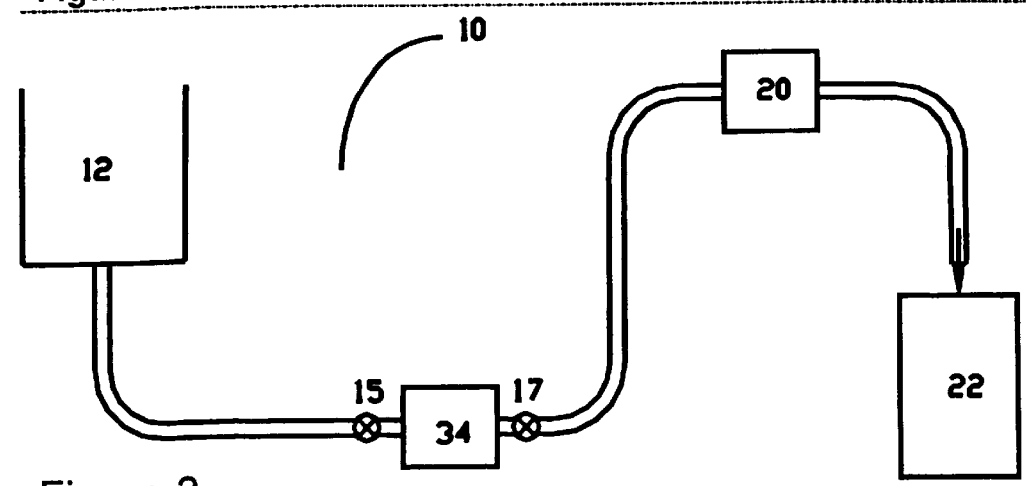
FIG. 3 is a plan diagram of a further exemplary liquid fiber dispenser system and process of the present invention.

Exemplary valves in the invention, as designated at 20 in FIG. 1 and as at 15, 17, and 20 in FIGS. 2 and 3, should have a flow-through diameter that is identical or similar to the diameter of immediately connecting pipes when in the full open position. Preferred valves are pinch valves having elastomer flow-through sleeves, because such valve designs do not require an interlocking "seating" to stop the flow of fluid through the valve. Actuation of such pinch valves into a closed position is accomplished by air or hydraulic pressure that is placed on the elastomer sleeve which then clamps shut the channel through which the fluid-fiber composition is conveyed through valves (20, 15, 17).

An exemplary scheme for controlling the dispensing system shown in FIG. 1 is as follows. The operator of the dispensing system uses a controller (computer system) to send an electrical signal to start the pump 14 and open the dispensing valve 20. The flow meter 18 records the volume of material dispensed and can send information to a computer or other monitoring or recording device for customer billing purposes. When the desired volume has been dispensed, the controller closes the dispensing valve 20 and stops the pump 14.

Another exemplary fiber dispensing device 10 is shown in FIG. 2 which employs, in addition to storage tank 12, pump 14, meter 18, and valve 20, a reservoir 24 that stores the liquid-fiber material under pressure. This exemplary reservoir 24 is preceded by feed-in valve 15 and followed by discharge valve 17, and replaces the optional pulsation dampener 16 shown in FIG. 1. The exemplary pressure and material reservoir 24 comprises a tank containing a bladder that allows air to compress as the reservoir is filled with the liquid-fiber material, when feed-in valve 15 is open and discharge valve 17 is closed, such that liquid-fiber material can then be pushed out of the reservoir 14 when discharge valve 17 is open and feed-in valve 15 is closed. Alternatively, any hydraulic fluid (e.g., water, oil) can be used to force the liquid-fiber material through the system. Another exemplary pressure and material reservoir 24 uses a piston that pushes against a sealed air or hydraulic chamber where the pressure in the chamber is then used to push material out of the reservoir in a smooth manner when discharge valve 17 is open.

An exemplary control scheme for the FIG. 2 configuration of the invention is as follows. The flow meter 18 volumetrically measures the amount of liquid-fiber composition and sends a corresponding electrical signal to a controller. When a desired volume has been dispensed, the controller closes the discharge valve 17 and the dispensing valve 20. When a certain low pressure in the reservoir 24 is attained, a pressure transducer in the reservoir 24 sends a signal to the controller which opens feed-in valve 15 and starts the pump 14 to fill the vessel 24 with liquid-fiber composition from the storage vessel 12. When a certain pressure level is reached in the reservoir 24, a pressure transducer sends a signal to the controller which stops the pump 14 and closes the feed-in valve 15.

A still further exemplary liquid-fiber dispensing device is shown in FIG. 3. A storage vessel 12 is connected to a pressure/vacuum vessel 34 having load cells. The pressure/vacuum vessel 34 replaces the reservoir/bladder system 24 and flow meter 18 shown in FIG. 2. An exemplary vacuum/pressure vessel 34 is a tank connected to a vacuum pump which creates a vacuum in the tank 34 so that liquid-fiber composition can be drawn from the storage vessel 12 when the feed-in valve 15 is opened and the discharge valve 17 is closed. Air or water pressure is then applied to the vessel 34 to expel the material when discharge valve 17 is open and feed-in valve 15 is closed. The vacuum and pressure devices connected to the vessel 34 may comprise, for example, mechanically, pneumatically, or hydraulically actuated piston devices.

An exemplary control scheme for the liquid-fiber shown in FIG. 3 may be as follows. If air is used for vacuum and pressure, a load cell connected to the pressure-vacuum vessel 34 sends a signal to the controller when it senses that liquid-fiber material is sufficiently depleted from the vessel 34. The controller then sends a signal to open the feed-in valve 15 and to activate the vacuum device, so that liquid-fiber material can be drawn from the storage vessel 12 into the pressure-vacuum vessel 34. When the load cell detects that the amount of liquid-fiber material has been sufficiently replenished, the controller then shuts the feed-in valve 15 and shuts down the vacuum device. The controller then sends a signal to a pressure device that places a positive pressure on the contents of the vessel 34, so that when a dosage is needed the discharge valve and dispensing valve 20 can be opened to dispense the liquid-fiber material. If the pressure-vacuum vessel 34 is located sufficiently close to the ready mix truck 22 or other vessel, then it may be possible to use just one valve 17 or 20 instead of two. If water is used for vacuum and pressure, metering the volume of water added or removed from the vessel can replace the function performed by the load cells.

The present invention is not to be limited by the foregoing detailed embodiments and examples which are provided for illustrative purposes only.

It is claimed:

1. A fiber composition, comprising:
    a plurality of fibers suspended in an aqueous environment comprising water but essentially devoid of a water-settable inorganic binder material comprising cement or concrete;
    said fibers comprising material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers;
    said fibers in an amount no less than 5 percent based on total weight of composition;
    said fibers in an amount no greater than 40 percent based on total weight of composition;
    said aqueous environment having a viscosity no less than 5,000 milliPascal·seconds (as measured by Brookfield viscometer at 25 degrees C.);
    said aqueous environment having a viscosity no greater than 200,000 milliPascal·seconds (as measured by Brookfield viscometer at 25 degrees C.); and
    said aqueous environment having at least one viscosity modifier for increasing the water viscosity within said aqueous environment.

2. The composition of claim 1 wherein said fibers comprise a polyolefin.

3. The composition of claim 1 wherein said fibers comprise polypropylene.

4. The composition of claim 1 wherein said plurality of fibers, said fibers having a mean transverse dimension no less than 5 $\mu$m and wherein said fibers have a mean transverse dimension no greater than 100 $\mu$m.

5. The composition of claim 4 wherein said fibers have a mean transverse dimension no less than 15 $\mu$m and said fibers have a mean transverse dimension no greater than 35 $\mu$m.

6. The composition of claim 1 wherein said plurality of fibers are comprised of fibers having two opposed ends connected by an elongate intermediate body, the average length of said fiber bodies being no less than 5 mm (millimeter), the average length of said fiber bodies being no greater than 50 mm, the mean transverse dimension of said fiber bodies being no less than 5 $\mu$m, and the mean transverse dimension of said fiber bodies being no greater than 100 $\mu$m.

7. The composition of claim 1 wherein said plurality of fibers are comprised of fibers having two opposed ends connected by an elongate intermediate body, the average length of said fiber bodies being no less than 10 mm, the average length of said fiber bodies being no greater than 20 mm, the mean transverse dimension of said fiber bodies being no less than 15 $\mu$m, and the mean transverse dimension of said fiber bodies being no greater than 35 $\mu$m.

8. The composition of claim 1 wherein
    said fibers are present in an amount no less than 15 percent based on total weight of the composition; and
    said fibers are present in an amount no greater than 25 percent based on total weight of the composition.

9. The composition of claim 1 wherein
    said aqueous or non-aqueous environment has a viscosity no less than 7,500 milliPascal·seconds (as measured by Brookfield viscometer at 25 degrees C. and 1 rpm); and
    said aqueous or non-aqueous environment has a viscosity no greater than 50,000 milliPascal·seconds (as measured by Brookfield viscometer at 25 degrees C. and 60 rpm).

10. The composition of claim 1 wherein
    said aqueous or non-aqueous environment has a viscosity no less than 10,000 milliPascal·seconds (as measured by Brookfield viscometer at 25 degrees C. and 1 rpm); and
    said aqueous or non-aqueous environment has a viscosity no greater than 20,000 milliPascal·seconds (as measured by Brookfield viscometer at 25 degrees C. and 60 rpm).

11. The composition of claim 1 wherein said at least one viscosity modifier comprises: an acrylic acid or salt thereof; a polysulfonic acid or salt thereof; a polyvinyl alcohol; a polyethylene glycol; a polyethylene oxide; a polysaccharide or derivative thereof; a non-water-settable inorganic material; or a mixture of the foregoing.

12. The composition of claim 1 wherein said at least one viscosity modifier is selected form the group consisting of hydroxy propyl methylcellulose, welan gum, and xanthan gum.

13. The composition of claim 1 wherein said at least one viscosity modifier is present in an amount no less than 0.5 percent based on weight of composition and said at least one viscosity modifier is present in an amount no greater than 5.0 percent based on weight of composition.

14. The composition of claim 1 further comprising an admixture selected from the group consisting of a superplastizicer, water reducer, strength enhancer, concrete-fiber bond enhancement agent, air entrainer, air detrainer, corrosion inhibitor, set accelerator, set retarder, shrinkage reducing admixture, fly ash, silica fume, pigment, finish enhancing chemicals, internal curing compounds, or a mixture thereof.

15. The composition of claim 1 wherein fibers are coated with a wetting agent prior to being suspended in said aqueous or non-aqueous suspension.

16. The composition of claim 1 wherein said plurality of fibers comprise bundles of fibers.

17. A method for modifying a matrix material, comprising: dispensing the fiber composition of claim 1 into a matrix composition.

18. The method of claim 17 wherein said matrix composition is cementitious.

19. The method of claim 18 wherein said fiber composition is pumped and metered into said matrix composition.

20. A method of admixing fibers comprising:

pumping into a hydratable cementitious composition a plurality of fibers suspended in an aqueous environment essentially devoid of a water-settable inorganic binder material comprising cement or concrete; said fibers comprising material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers; said fibers being in an amount no less than 5 percent based on total weight of composition; said fibers being in an amount no greater than 40 percent based on total weight of composition; said aqueous environment having a viscosity no less than 5000 milliPascal·seconds (as measured by Brookfield viscometer at 25 degrees C.); said aqueous environment having a viscosity no greater than 200,000 milliPascal·seconds (as measured by Brookfield viscometer at 25 degrees C.); and said aqueous environment having at least one viscosity modifier for increasing the water within said aqueous environment.

21. The method of claim 20 wherein said fibers are made from a polypropylene, a polyethylene, or a mixture thereof; and said plurality of fibers comprise fibers having two opposed ends connected by an elongate intermediate body, the average length of said fiber bodies being no less than 5 mm, the average length of said fiber bodies being no greater than 50 mm, the mean transverse dimension of said fiber bodies being no less than 5 $\mu$m, and the mean transverse dimension of said fiber bodies being no greater than 100 $\mu$m.

* * * * *

UNITED STATES PATENT AND TRADEMARK OFFICE
CERTIFICATE OF CORRECTION

PATENT NO. : 6,569,233 B2  Page 1 of 6
APPLICATION NO. : 09/962830
DATED : May 27, 2003
INVENTOR(S) : Macklin et al.

It is certified that error appears in the above-identified patent and that said Letters Patent is hereby corrected as shown below:

PLEASE DELETE COLUMNS 1 LINE 1 THROUGH COLUMN 18 LINE 28 AND INSERT COLUMN 1 LINE 1 THROUGH COLUMN 10 LINE 16 AS ATTACHED

Signed and Sealed this

Third Day of June, 2008

JON W. DUDAS
*Director of the United States Patent and Trademark Office*

PUMPABLY VERIFIABLE FLUID FIBER COMPOSITIONS

FIELD OF THE INVENTION

The invention relates to fibers for plastic shrinkage crack control in cementitious compositions, and more particularly to a fiber composition that can be pumped and metered in a fashion similar to dispensing of fluid-type chemical admixtures, thereby facilitating verification of accurate dosage and achieving rapid and substantially uniform fiber dispersion within the mix.

BACKGROUND OF THE INVENTION

It is known in the construction industry to add fibers into fresh cementitious mixtures to improve characteristics of the resulting hardened structure. Natural fibers (e.g. Sisal, cotton ) and fibers made of steel, glass, carbon or synthetic materials are typically added into concrete to improve fracture toughness and to retard crack propagation. Concrete is prone to self-induced cracking, and, as it is a brittle material, these cracks propagate readily under relatively low stresses.

Self-induced, non-structural cracks occur in large masses of ready-mixed concrete or shotcrete due to small cracks that form early (e.g., cracks resulting from shrinkage of concrete or shotcrete during its plastic state), and these are subsequently propagated by stresses induced by changes in the dimension of such relatively large structures. Pavement concrete units, for example, are typically about 3 meters by 10 meters by 200 millimeters. Small cracks in such concrete can readily propagate, producing a weak link that results in subsequent fracture. This clearly visible cracking is often the only form of cracking that is perceived as being of importance, but it is a direct result of much smaller and probably essentially invisible earlier crack development.

In U.S. Pat. No. 5,399,195, Hansen et al. taught the use of very fine synthetic polymer fibers (e.g., polypropylene, polyethylene, polyester) for preventing self-induced cracks from developing due to plastic shrinkage of concrete at the micro-level. To promote substantially homogeneous dispersal of the fine fibers in the concrete using conventional mixing techniques and equipment, this patent disclosed that fiber bundles containing up to about 10,000 fibers (e.g., filaments, tapes) could be treated with conventional wetting agents to render them hydrophilic, thereby facilitating their introduction into concrete.

Other means are known for admixing fibers into concrete. For example, U.S. Pat. No. 4,961,790 of Smith et al. disclosed a soluble bag for introducing fibers into a concrete mix. In U.S. Pat. No. 5,224,774, Valle et al. disclosed non-water-soluble packaging that disintegrated due to the grinding action of concrete thereby achieving substantially uniform fiber dispersal. These enabled ready-mix truck operators to avoid having to handle loose fibers and facilitated their dispersal within the mix.

Nevertheless, there remains a need for verifying that plastic shrinkage control fibers are incorporated into the concrete mix at the correct dosage; and, secondly, to ensure that they are properly intermixed to avoid balling and to achieve substantially uniform dispersal throughout the concrete mix. Synthetic polymer fibers, particularly the fine fibers or fibrillated tapes used for plastic shrinkage control, are difficult to see in the wet mix. Not only might such fibers have transverse dimensions as small as 5-30 μm, but they tend to be incorporated at low dosage rates due to their cumulatively large surface area. If clumping occurs beneath the concrete surface, these remain undetected; if clumps are found at the surface, these may be detected and removed for aesthetic reasons. In either case, the proper fiber dosage is not achieved; the risk of plastic shrinkage cracking increases.

Another major difficulty in verification is that fibers are added by the ready-mix truck operator who delivers the concrete to the construction site. The fibers are usually incorporated in dry batch amounts of 0.2-2.0 pound bags into the ready-mix trucks, wherein the bags disintegrate or dissolve to release the fibers into the concrete. Those ready-mix truck operators who are unscrupulous may use fewer than the prescribed amount of bags to pocket the difference and avoid the messiness, labor, and 10-15 minute delay necessitated per trip by this manual process. On the other hand, those ready-mix truck operators who are merely sloppy or negligent may fail to provide adequate mixing, may use the wrong fiber dosage or type, or may forget the fibers altogether. In each case, the risk of plastic shrinkage cracking increases (as does the ready-mix producer's liability for faulty concrete).

Ideally, the present inventors believe that automated addition of fibers at a ready-mix plant would help to resolve the multi-faceted problem of verification and to minimize or eliminate expensive concrete ready-mix truck standing time. This is because fiber addition can be performed under certifiable conditions by the batch plant operator, who has customarily been responsible for ensuring that desired chemical admixtures (e.g., water reducers, set accelerators or retarders, pigments, etc.) are added into the concrete mix at prescribed dosage levels. In other words, the fiber addition could be automated and recorded by computer panel instead of being performed manually as is the present case. This would avoid having to rely on truck operators who might lack the requisite experience, training, honesty, concern, diligence, or patience (or all of the above) to perform the task properly.

At present, a number of bulk fiber system for automated dispensing of dry fibers are available. For example, Intech Corporation of Frederick, Colo., manufactures a system employing a vacuum to convey dry fibers into aggregate weigh hoppers, conveyor belts, or into concrete trucks. The system also purportedly has a capability for handling up to 300 pound bulk bags by automatic reloading. However, the present inventors believe that such bulk loading equipment may be too costly, complicated, and inconvenient for ready-mix plant operators to use or to integrate with existing chemical admixture dispensing equipment. This dry bulk fiber system does not provide verification that extremely fine, high-surface-area fibers of the kind used for plastic shrinkage control are sufficiently wetted out so as to achieve substantially uniformly dispersion in the concrete.

Accordingly, the present inventors believe that novel fibers and methods of fiber addition are needed.

SUMMARY OF THE INVENTION

In surmounting the disadvantages of the prior art, the present invention provides an aqueous fiber composition useful for dispensing fibers into matrix materials such as concrete or shotcrete, using pumping and metering equipment that permits automated control and verifiability of accurate dosage amounts. Although fibers made from synthetic polymers (e.g., polyolefin) are typically hydrophobic, suspending them in an aqueous fluid environment is believed to expedite their introduction into a wet concrete mix, to minimize clumping and facilitate intermixing, and to ensure substantially uniform distribution within the cementitious mix.

Thus, an exemplary fiber composition of the invention comprises a plurality of fibers, preferably made of synthetic polymers, glass, carbon or regeneratable sources, are suspended in an aqueous environment comprising water but essentially devoid of water-settable inorganic binder material, the fibers being present in the range of 5-40% based on weight of the composition, the aqueous environment comprising at least one viscosity modifier for increasing the viscosity of the water within the aqueous environment, which has a Brookfield viscosity of 5,000-200,000 milliPascal-seconds measured at 25 degrees Celsius.

Exemplary methods of the invention comprise dispensing the above-described fiber composition into a cementitious mix, and preferably this is accomplished by pumping and metering the prescribed dosage of fibers into the mix. Accurate dosages of the fibers may thus be performed and verified by the concrete manufacturer.

Thus, the present invention provides the ability to pump and meter fibers at high speed into cementitious mixtures and to provide the ability to automate and to monitor the fiber addition. Moreover, the fiber compositions of the invention are also believed to improve pumpability and cohesiveness of reinforced cementitious materials such as shotcrete and spray-applied fireproofing. In addition to use in ready-mix concretes, the fiber compositions are particularly useful in self-compacting concretes and mortars in which compaction and workability are issues.

Further advantages and features of the invention are further described in detail hereinafter.

DESCRIPTION OF PREFERRED EMBODIMENTS OF THE INVENTION

The fiber compositions of the present invention are intended for modifying properties of any matrix composition, including, without limitation, adhesives, emulsions, composite materials (e.g., resins), plastics, elastomers such as rubber, etc., and cementitious materials. Of particular importance to the present inventors are hydratable cementitious materials such as ready-mix concrete, precast concrete, masonry, shotcrete, bituminous concrete, gypsum-based compositions (such as compositions for wallboard), gypsum- and/or Portland cement-based fireproofing compositions (for boards and spray-application), and other hydratable cementitious compositions.

In connection with hydratable cementitious compositions, the terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace slag, pozzolans, metakaolin, and silica fume or other materials commonly included in such cements) and water; mortars are pastes additionally including fine aggregate (e.g., sand); and "concretes" are mortars additionally including coarse aggregate (e.g., gravel, stones). The term "cementitious" thus refers to and includes the foregoing. For example, a cementitious composition may be formed by mixing required amounts of certain materials, e.g., hydratable cementitious binder, water, and fine and/or coarse aggregate, as may be desired, with fibers as described herein.

The fibers of the invention may comprise material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers. Plastic shrinkage performance may be achieved using a number of fiber shapes, such as monofilament (round), elliptical, flat (ribbon shaped), prefibrillated (e.g., slit tape, slit sheet), or other shape.

Preferred synthetic polymers are polypropylene and polyethylene, with polypropylene being most preferred for controlling plastic shrinkage cracking in concrete. Exemplary individual fiber bodies of the invention may comprise 100% polypropylene, or, as another example, may comprise predominantly polypropylene (e.g., at least 70-99%) with the remainder comprising another polymer (such as high density polyethylene, low density polyethylene) or optional fillers, processing aids, and/or wetting agents, such as are conventionally used in the manufacture of polymer fibers. Fibers believed suitable for the present invention and particularly for plastic shrinkage control, are disclosed in U.S. Pat. No. 5,399,195 of Hansen et al., which is incorporated herein by reference. Preferably, the plurality of fibers comprise individual fibers having two opposed ends connected by an elongate intermediate body, the average length of the fiber bodies being 5-50 millimeters, and more preferably 10-20 millimeters in length, and the mean transverse dimension of said fiber bodies being 5-100 μm, and more preferably 15-35 μm. Fibers within these dimensions are available from Grace Construction Products of Cambridge, Mass.

Another exemplary fiber material believed suitable for use in the present invention comprises a polypropylene coated with a polyhydroxyaminoether material. Such fibers are available from Dow Chemical, Midland, Mich.

Exemplary fibers of the invention are suspended in a wet fluid aqueous environment with the resultant combination being characterizable as having the consistency of a pumpable "grease" or "wet paste." While it is known to coat or lubricate fibers with conventional wetting agents, this concept is different than an aqueous suspension of synthetic polymer fibers that is pumpable and capable of being metered. While it is also known that synthetic polymer fibers can be suspended in sprayable shotcrete slurries and sprayable fireproofing slurries (which contain hydratable cementitious binders), the present inventors believe that it is novel to employ, as a means for delivering and pumping synthetic polymer fibers into a cementitious mix, an aqueous suspension of synthetic polymer fibers that is essentially devoid of water-settable inorganic binder material. The term "essentially" is used herein to refer to the total absence of any water-hardenable inorganic binder material, or else to its near-absence (ie. amounts so miniscule or de minimus as not to cause the aqueous suspension of fibers to stiffen or harden whereby pumpability is thwarted).

Preferably, the plurality of fibers is added into the aqueous environment (the suspension medium) incrementally and mixed by slow rotating mixing elements. It is preferred that the fibers are present in bundles, which arise conventionally through the fiber manufacturing process, wherein bunches of continuous strands are chopped to the desired lengths and may be fixed into bundles using conventional wetting agents (e.g., surfactants, emulsions, etc.). If the fiber is packaged with minimal mechanical disturbance, the bundles can remain intact. The fiber bundles are deliberately kept intact in the suspension also to facilitate flowability of the fibers, such that the resulting thick suspension has the necessary flow characteristics to permit continuous pumping using mechanical pumping equipment. When fibers are in bundles, less water is attached to the fiber surface and thus more water is available for flow especially at high fiber concentrations. Also, each bundle is believed to act as a solid independent suspended particle within the fluid medium, and consequently this reduces fiber-fiber interaction which otherwise is detrimental to flow characteristics of the suspension. The retention of this preferred bundle structure is helped by the high viscosity of the surrounding fluid medium wherein capillary flow is reduced and water is prevented from penetrating the bundles and becoming absorbed.

Accordingly, bundles of fibers (e.g., filaments) are preferably coated with a wetting agent during manufacture or otherwise prior to being inserted into the aqueous suspension medium. The choice of optional wetting agent is not believed to be critical to the present invention, although it would be preferred to choose wetting agents that do not negatively impact the concrete properties and do not introduce substantial amounts of air into the mix. Exemplary wetting agents are disclosed in U.S. Pat. No. 5,399,195 of Hansen et al., incorporated herein by reference. Preferred wetting agents are fatty acid esters of glycerides, fatty acid amides, polyglycol esters, polyethoxylated amides, nonionic surfactants, cationic surfactants and blends of the above (See e.g., U.S. Pat. No. 5,399,195).

In exemplary embodiments of the invention, the fibers (preferably in bundles as just discussed) are suspended in an aqueous environment having a viscosity of 5,000-200,000 milliPascal*seconds as measured by Brookfield viscometer at 25 degrees C. More preferably, the viscosity is 7,500-50,000, and, most preferably, the viscosity is 10,000-20,000 milliPascal*seconds (Brookfield, 25 degrees C.).

While bundled fibers are believed to provide the highest solids content, it is possible to use loose fibers, fibrillated fibers, fibrillatable fibers, tapes, or other conventional shapes as may be customarily supplied into the construction industry.

Exemplary viscosity modifying agents useful for increasing the viscosity of the water in the aqueous suspension can comprise any water soluble polymer, preferably having a linear molecular structure; polyacrylic acid or salt thereof; polyacrylamide; polyvinylmethyl ether; a polysulfonic acid or salt thereof; a polyvinyl alcohol; a polythylene glycol; a polyethylene oxide; a polysaccharides or derivatives thereof; a non-water-settable inorganic binder (nano clay); or mixture thereof. A preferred viscosity modifier is hydroxy propyl methylcellulose. Viscosity modifiers used in the invention should be chosen such that the final concrete properties are not adversely affected, and such that they are compatible with other admixtures that may be incorporated into the final cementitious mix.

A preferred exemplary fiber composition of the invention comprises the following components in the following percentages based on total weight of the composition polypropylene fibers (5-40%); viscosity modifier (0.2-5%); and water (95-60%)

Fiber compositions of the invention may comprise one or more admixtures as may be known in the concrete art. Exemplary admixtures include superplasticizers, water reducers, strength enhancers, concrete-fiber bond enhancing agents, air entrainers, air detrainers, corrosion inhibitors, set accelerators, set retarders, shrinkage reducing admixtures, fly ash, silica fume, pigments, finish enhancing chemicals, internal curing compounds (e.g., methylcellulose), or a mixture thereof. Known admixtures may be employed, such as, for example, those categorized in U.S. Pat. No. 5,203,692 of Valle et al., or in U.S. Pat. No. 6,224,250 of Kreinheder et al, both incorporated by reference herein. The fibers may also be coated with wetting agents or other coating materials known to those of ordinary skill in the art, as previously mentioned above.

The invention therefore provides a novel method for modifying water-based matrix materials, particularly cementitious compositions. Accordingly, an exemplary method comprises dispensing, into a hydratable cementitious composition, a plurality of synthetic polymer fibers suspended in an aqueous environment essentially devoid of a water-settable inorganic binder material; said fibers being in an amount no less than 5 percent based on total weight of composition; said fibers being in an amount no greater than 40 percent based on total weight of composition; said aqueous environment having a viscosity no less than 5000 milliPascal*seconds (as measured by Brookfield viscometer at 25 degrees Celsius); said aqueous environment having a viscosity no more than 200,000 milliPascal*seconds (as measured by Brookfield viscometer at 25 degrees C.); and said aqueous environment having at least one viscosity modifier for increasing the viscosity within said aqueous environment.

The fiber compositions of the invention may be packaged in large "totes" (plastic or metal drums or bulk containers) for shipment to concrete ready-mix plants or other locations. The fiber compositions of the invention may also be conveyed in bladders (large bags) that are, in turn, contained in boxes.

In other exemplary embodiments, the aqueous fiber suspensions may comprise one or more biocidal agents. The term "biocidal agents" as used herein refer to agents commonly used for inhibiting bacterial and fungal growth, including fungicidal, germicidal, and insecticidal agents. Preferred biocidal agents include 4-chloro-3 methyl phenol (and other polyhalogenated phenols); sodium-O-phenylphenate; benzylbromoacetate; 1,2-dibromo 2,4-dicyanobutane; dieldrin emulsions; copper compounds; or mixture thereof.

The fiber compositions of the invention may be dispensed into the matrix material (e.g., concrete or other cementitious composition) using conventional metering pump equipment of the kind used for pumping pastes, greases, industrial lubricants, and other viscous liquids as known in these industries. Accordingly, the aqueous fiber suspensions may be dispensed into matrix compositions using pumping and metering equipment conventionally used for dispensing greases, lubrication, flowable pastes, etc. For example, automatic grease lubrication systems are used for pellet presses, gears, stone-crushers, cement kilns, screw conveyors, travelling hoists, process filters, ship steering, and lubrication of rudder shafts, cranes, rotary filters, industrial separators, etc. Such lubrication systems usually involve heavy-duty electric pumps or hydraulic pumps for conveying viscous grease lubricants from bulk barrels, through tubing or pipes, to any number of lubrication points. A preferred pump is a volumetric reciprocating piston pump wherein the number of strokes can be controlled to meter the required amount of the suspension being conveyed under pressure. Thus, the amount of addition can be pumped and metered using piston pumps, for example, and the amounts of addition can be monitored by automated means (e.g., counting the number of piston strokes).

Further features and advantages of the exemplary fiber compositions and processes of the invention may be illustrated by reference to the following example.

EXAMPLE 1

A 1.5 weight % aqueous solution of hydroxypropyl methyl cellulose—referred to as HPMC hereafter—

(Methocel K15M, supplied by Dow Chemical Co, USA) is prepared as follows: about 2.5 kg of water is heated to about 90 degrees C. 120 grams of HPMC is dispersed into the hot water while stirring. This mixture is further added to cold water (about 15 degrees C.) while stirring to make up to a total of 8 kg. The mixture is stirred to render it homogeneous and is allowed to reach ambient temperature. (Optionally a suitable germicidal agent can be added to this solution to prevent any biological growth during storage). The resulting solution has a Brookfield viscosity of about 10,000 mPa.s at 25 degrees C. Eight kilograms of the solution thus prepared is measured into a mixing machine with slow rotating intermeshing mixing elements. 2 kg of a plastic shrinkage control fiber (having transverse dimension less than 30 μm) (available from Grace Construction Products under the name Microfiber) is added to this solution in increments of 200 grams while mixing. It is important that mixing be performed so as to achieve a homogeneous suspension, and that proper care be taken to cause minimum disturbance to the bundled structure of the fiber. The fiber suspension can be stored in suitable containers such as pails, drums or bag-in-a-box.

The present invention is not to be limited by the foregoing detailed embodiments and example which are provided for illustrative purposes only.

It is claimed:

1. A fiber composition, comprising:
    a plurality of fibers suspended in an aqueous environment comprising water but essentially devoid of a water-settable inorganic binder material comprising cement or concrete;
    said fibers comprising material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers;
    said fibers in an amount no less than 5 percent based on total weight of composition;
    said fibers in an amount no greater than 40 percent based on total weight of composition;
    said aqueous environment having a viscosity no less than 5,000 milliPascal-seconds (as measured by Brookfield viscometer at 25 degrees C.);
    said aqueous environment having a viscosity no greater than 200,000 milliPascal-seconds (as measured by Brookfield viscometer at 25 degrees C.); and
    said aqueous environment having at least one viscosity modifier for increasing the water viscosity within said aqueous environment.

2. The composition of claim 1 wherein said fibers comprise a polyolefin.

3. The composition of claim 1 wherein said fibers comprise polypropylene.

4. The composition of claim 1 wherein said plurality of fibers, said fibers having a mean transverse dimension no less than 5 μm and wherein said fibers have a mean transverse dimension no greater than 100 μm.

5. The composition of claim 4 wherein said fibers have a mean transverse dimension no less than 10 μm and said fibers have a mean transverse dimension no greater than 30 μm.

6. The composition of claim 1 wherein said plurality of fibers are comprised of fibers having two opposed ends connected by an elongate intermediate body, the average length of said fiber bodies being no less than 5 millimeters, the average length of said fiber bodies being no greater than 50 millimeters, the mean transverse dimension of said fiber bodies being no less than 5 μm, and the mean transverse dimension of said fiber bodies being no greater than 100 μm.

7. The composition of claim 1 wherein said plurality of fibers are comprised of fibers having two opposed ends connected by an elongate intermediate body, the average length of said fiber bodies being no less than 10 millimeters, the average length of said fiber bodies being no greater than 20 millimeters, the mean transverse dimension of said fiber bodies being no less than 15 μm, and the mean transverse dimension of said fiber bodies being no greater than 35 μm.

8. The composition of claim 1 wherein
    said fibers are present in an amount no less than 15 percent based on total weight of the composition; and
    said fibers are present in an amount no greater than 25 percent based on total weight of the composition.

9. The composition of claim 1 wherein
    said aqueous environment has a viscosity no less than 7,500 milliPascal-seconds (as measured by Brookfield viscometer at 25 degrees C.); and
    said aqueous environment has a viscosity no greater than 50,000 milliPascal-seconds (as measured by Brookfield viscometer at 25 degrees C.).

10. The composition of claim 1 wherein
    said aqueous environment has a viscosity no less than 10,000 milliPascal-seconds (as measured by Brookfield viscometer at 25 degrees C.); and
    said aqueous environment has a viscosity no greater than 20,000 milliPascal-seconds (as measured by Brookfield viscometer at 25 degrees C.).

11. The composition of claim 1 wherein said at least one viscosity modifier comprises: an acrylic acid or salt thereof; a polysulfonic acid or salt thereof; a polyvinyl alcohol; a polythylene glycol; a polyethylene oxide; a polysaccharide or derivative thereof; a non-water-settable inorganic material; or a mixture of the foregoing.

12. The composition of claim 1 wherein said at least one viscosity modifier is hydroxy propyl methylcellulose.

13. The composition of claim 1 wherein said at least one viscosity modifier is present in an amount no less than 0.5 percent based on weight of composition and said at least one viscosity modifier is present in an amount no greater than 5.0 percent based on weight of composition.

14. The composition of claim 1 further comprising an admixture selected from the group consisting of a superplasticizer, water reducer, strength enhancer, concrete-fiber bond enhancement agent, air entrainer, air detrainer, corrosion inhibitor, set accelerator, set retarder, shrinkage reducing admixture, fly ash, silica fume, pigment, finish enhancing chemicals, internal curing compounds, or a mixture thereof.

15. The composition of claim 1 wherein fibers are coated with a wetting agent prior to being suspended in said aqueous suspension.

16. The composition of claim 1 wherein said plurality of fibers comprise bundles of fibers.

17. A method for modifying a matrix material, comprising: dispensing the fiber composition of claim 1 into a matrix composition.

18. The method of claim 17 wherein said matrix composition is cementitious.

19. The method of claim 18 wherein said fiber composition is pumped and metered into said matrix composition.

20. A method for admixing fibers comprising:

pumping into a hydratable cementitious composition a plurality of fibers suspended in an aqueous environment essentially devoid of a water-settable inorganic binder material comprising cement or concrete; said fibers comprising material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers; said fibers being in an amount no less than 5 percent based on total weight of composition; said fibers being in an amount no greater than 40 percent based on total weight of composition; said aqueous environment having a viscosity no less than 5000 milliPascal-seconds (as measured by Brookfield viscometer at 25 degrees C.); said aqueous environment having a viscosity no greater than 200,000 milliPascal-seconds (as measured by Brookfield viscometer at 25 degrees C.); and said aqueous environment having at least one viscosity modifier for increasing the water within said aqueous environment.

21. The method of claim 20 wherein said fibers are made from a polypropylene, a polyethylene, or a mixture thereof; and said plurality of fibers comprise fibers having two opposed ends connected by an elongate intermediate body, the average length of said fiber bodies being no less than 5 millimeters, the average length of said fiber bodies being no greater than 50 millimeters, the mean transverse dimension of said fiber bodies being no less than 5 μm, and the mean transverse dimension of said fiber bodies being no greater than 100 μm.

* * * * *